United States Patent [19]
Ostman

[11] Patent Number: 5,227,075
[45] Date of Patent: Jul. 13, 1993

[54] PROCESS AND APPARATUS FOR CONTINUOUS FILTERING AND LIQUID DISPLACEMENT OF A LIQUID SUSPENSION OF A FIBROUS OR FINELY-DIVIDED MATERIAL

[75] Inventor: Hakan Ostman, Jorvas, Finland

[73] Assignee: Salomans Oy Hackman Process Ltd., Jorvas, Finland

[21] Appl. No.: 768,979

[22] PCT Filed: Apr. 6, 1990

[86] PCT No.: PCT/FI90/00094
§ 371 Date: Dec. 5, 1991
§ 102(e) Date: Dec. 5, 1991

[87] PCT Pub. No.: WO90/11809
PCT Pub. Date: Oct. 18, 1990

[30] Foreign Application Priority Data
Apr. 7, 1989 [FI] Finland ............................. 891661

[51] Int. Cl.⁵ ................................................ B01D 33/15
[52] U.S. Cl. .................................. 210/781; 210/780; 210/784; 210/360.2; 210/402; 162/60
[58] Field of Search ............. 210/780, 781, 784, 359, 210/360.1, 360.2, 402, 928, 380.1, 380.2, 404; 162/60

[56] References Cited

U.S. PATENT DOCUMENTS

| | | | |
|---|---|---|---|
| 2,312,545 | 3/1943 | Haug | 210/380.1 |
| 2,370,999 | 3/1945 | Schutte | 210/380.1 |
| 2,685,235 | 8/1954 | Lindblad | 210/784 |
| 3,468,423 | 9/1969 | Pechon | 210/360.2 |
| 3,814,246 | 6/1974 | Wilson et al. | 210/380.1 |
| 4,266,413 | 5/1981 | Yli-Vakkuri | 210/404 |
| 4,502,171 | 3/1985 | Koskinen et al. | 210/404 |

*Primary Examiner*—Robert A. Dawson
*Assistant Examiner*—David Reifsnyder
*Attorney, Agent, or Firm*—Willian Brinks Olds Hofer Gilson & Lione

[57] ABSTRACT

The invention relates to a continuous-working process and apparatus for replacing the liquid in a liquid suspension of a fibrous material with another liquid by forming of this material a bed on a moving filter surface and by displacing the liquid present in this bed with the other liquid. The bed of material is formed on a cylindrical filter surface installed in a vertical orientation below the liquid surface in a container and conveys it continuously forward filtration and several successive liquid displacements effected by maintaining a hydrostatic pressure difference across the formed bed, which is conveyed continuously horizontally forward, and through it there flow liquids horizontally during the filtration and liquid displacement.

13 Claims, 3 Drawing Sheets

PROCESS AND APPARATUS FOR CONTINUOUS FILTERING AND LIQUID DISPLACEMENT OF A LIQUID SUSPENSION OF A FIBROUS OR FINELY-DIVIDED MATERIAL

The present invention relates to a process and apparatus in which a bed of material is formed by continuous filtration of a liquid suspension of a fibrous or finely-divided material on a continuously progressing filter surface, and the bed of material is conveyed forward in order to carry out liquid displacements in such a manner that at least a portion of the liquid content of the bed is displaced with another liquid by means of a liquid flow which is perpendicular to the forward-feeding direction of the above-mentioned material.

The filtration and liquid displacement operations of suspensions of material are of great importance, and they are used commonly in different branches of the process industry and especially in the pulp production processes in the wood processing industry, in which they are used:

in the washing of pulp, in which the fiber material is separated from the chemicals used in the digestion process and from the dissolved substances in the bleaching of pulp in the manner of pulp washing, but also in order to introduce bleaching chemicals into the fiber material in the so-called dynamic (displacement) bleaching for the preparation of cooking chemicals, for example in the causticization process in the sulfate pulp industry when the white liquor is being separated from the lime mud.

Initially, batch processes were used in the above operations. For example, the washing of pulp was carried out in a so-called diffuser, i.e. a screen-bottomed tank which was filled with pulp from the digester, by rinsing or pushing the pulp into it. Thereafter the so-called basic liquor of the pulp, which contains the chemicals used in the digestion and the dissolved substances, was displaced from the pulp through the screen bottom of the diffuser by adding a washing liquid into the upper section of the diffuser. When the pulp had in this manner been washed sufficiently clean, it was rinsed out from the diffuser, which could thereafter again receive a new batch of pulp for washing.

This type of simple batch washing of pulp was made more effective by using a so-called multistage process. In it the different steps were carried out in principle in the above manner, except that in the first step no washing water was used but a washing liquor diluted with washing water, the washing liquor having been recovered from the second washing step of the previous pulp batch, and that pure washing water was not used until the last step.

In such a batch diffuser wash the displacement of liquid in the fiber bed is effected by a vertical liquid flow, and in this case by a downward flow, taking advantage of the hydraulic pressure difference across the fiber bed, caused by gravity. Since the fiber bed is stationary, neither of the horizontal dimensions is utilized operationally in the displacement; they are used only to provide the washing apparatus physical dimensions (size) and thus to accomplish the desired pulp washing capacity.

In the batch filtering or liquid displacement it is, of course, also possible to use an arbitrarily chosen flow direction for the liquid and, for example, by means of suitable pumping arrangements and devices, to produce the necessary pressure difference in this selected direction across the fiber bed, which direction may be, for example, parallel to a radius which is arbitrarily oriented relative to gravity. It is, however, typical that in a batch washing process only one dimensional direction is used operationally, i.e. for liquid displacement in the pulp bed, whereas the two other dimensional directions, of which one may be tangential, only provide size for the apparatus.

Along with technical development, continuous methods have been adopted for the said operations, methods which have for a long time already been economically so competitive that they are now in an entirely predominant position in the pulp production industry. In a continuous method used for the said filtration and liquid displacement operations, two dimensional directions need to be used operationally in the operation itself: one as in the batch process for the liquid flow through the fiber bed, but in addition another dimensional direction perpendicular to the above-mentioned direction for the continuous conveying of the fiber bed forward.

It is conceivable quite theoretically that also in a continuous process the liquid displacement in a fiber bed could be carried out by using only one dimensional direction, i.e. by using the so-called countercurrent method, i.e. that the bed is conveyed forward in the direction completely opposite to the liquid flow. In practice, however, it is not possible to apply a countercurrent method of this type to the liquid displacement in a defibrated pulp bed, since the pressure difference necessary for producing the liquid flow would be so great that the mechanical force produced by it on the fibers in the pulp bed as compared with their mechanical strength would cause such compression of the bed that it would prevent sufficient liquid flow through the bed, and so it is not possible to develop technical apparatus for conveying the bed forward.

So far, the most common apparatus used for the washing of cellulose pulp as a continuous process has been a washing filter which is based on a rotating drum. Nowadays there are used different types of apparatus based on this, such as suction filters, pressure filters, washing presses, etc. What all of them have in common is that a drum rotating about a horizontal axis is used and that the pulp bed (web) is formed on top of the drum, where it is thereafter washed by adding a washing liquid over the web and by sucking the filtrate from the bed through the screen surface of the drum.

In principle it is conceivable that one washing filter of this type can be used for carrying our several displacements with the same drum, but in practice at maximum two displacement steps are advantageous. Today, in order to accomplish a sufficiently effective washing of pulp, there are normally required four washing filters, which are coupled according to the countercurrent principle to constitute the entire washing department.

In order to be able to carry out the washing of pulp effectively enough by using one main apparatus, there has been developed the so-called flat-wire washer, the principle of which is the same as that of the wet end of the pulp-drying machine, where by increasing the wire length it is possible to accommodate the number of liquid displacement steps, i.e. washing steps, necessary for accomplishing a sufficient washing efficacy.

Above in the drum filter the pulp web travels forward in the tangential direction and the liquid flows through the pulp web in the radial direction. In the flat-wire washer the pulp web travels continuously in the horizontal direction along with the wire and the washing liquid is displaced through the pulp web vertically downward from above.

In addition to these, the continuous-working diffuser and the pressure diffuser constitute very commonly used pulp-washing equipment. In these apparatuses the pulp travels forward vertically and the washing liquid is displaced in a horizontal radial direction through the pulp bed formed in the apparatus.

It can be noted that, in the equipment so far developed and used for washing pulp, there is used operationally not only one of the horizontal dimensional directions but always also the vertical dimensional direction, either for the conveying of the pulp bed or for liquid displacement, or both.

It has been observed that the continuous washing apparatuses used so far are not very efficient in the sense that the effectiveness of the displacement accomplished in them at its best is only one-half of that which is possible in batch displacement, and normally, for example, in a suction filter or a drum filter it is only one-fourth of the effectiveness of batch displacement. For this reason it is necessary, as stated above, to couple several washing apparatuses in a series in order to accomplish sufficiently effective pulp washing without the recovered chemical solution becoming unnecessary diluted.

Therefore, the equipment required today for the washing of pulp is relatively complex and expensive. In addition, various practical problems are common. For example, foaming problems are very significant, especially in the washing of sulfate pulp. Because of these problems it is necessary to use defoaming chemicals, the use of which is common. The energy requirement is also in general multiple as compared with the theoretical energy requirement for the accomplishment of the conveying of the pulp and the liquid displacement, and so the operating costs of the washing of pulp are also considerable.

The object of the present invention is to eliminate, or at least to reduce, the above disadvantages involved in the current methods and equipment by providing, in a continuous process, liquid displacement which is as effective as in the batch process, and to eliminate, among others, the foaming problems. The main characteristics of the invention are given in the accompanying claims.

According to the invention it has been observed that, if the vertical dimensional direction is left operationally unused and only the existing two horizontal dimensional directions are used for conveying the pulp bed forward and for displacing liquid through it, and that the screen surface which conveys the pulp forward and through which the liquid displaced from the pulp bed is removed is in its entirety in the liquid, it is possible to find an apparatus system which eliminates the above disadvantages involved in the current equipment.

The principle of the invention is as follows:

The filter surface, i.e. the screen surface, on which there is first formed a bed of a fiber material by thickening a fiber material suspension fed onto it, and which feeds and conveys the pulp bed forward for the carrying out of the liquid displacements, has been installed so that at each point the cross section perpendicular to the travel direction is vertical. The screen surface is made of an endless, wide band which is permeable to liquid but not to fiber, i.e. a wire or preferably a thin perforated steel band.

The track profile of the screen band may in principle be arbitrary: it may be produced, for example, by using vertically installed support rolls and drawing rolls. However, the track profile which is the simplest of all and in general the most advantageous in terms of process and equipment technology is a round profile. In this case the screen surface is a round cylindrical mantle which rotates about an imaginary vertical axis located on the center axis of the mantle.

In this case, taking into account considerations such as strength, the most advantageous system is obtained when the pulp web of the fiber material is formed on the interior surface of the mantle.

Regardless of the type of track profile that the screen surface constitutes, the screen surface and the pulp web formed on it is kept continuously below the liquid level in order that it should be possible to produce a constant pressure difference over the entire width of the screen surface, to prevent the mixing of air or other gases with the liquid and the pulp web, and to produce and maintain the desired liquid flow conditions.

In this system of principle the pressure difference needed to cause the liquid flow which effects the forming of a pulp bed on the screen surface and thereafter the desired liquid displacements in the pulp web is produced by maintaining a higher liquid level inside the screen mantle than outside the screen mantle.

Below, the best apparatus alternative for implementing the process according to the invention is discussed in detail.

The invention is described below in greater detail with reference to the accompanying drawings, in which.

Figure 1:
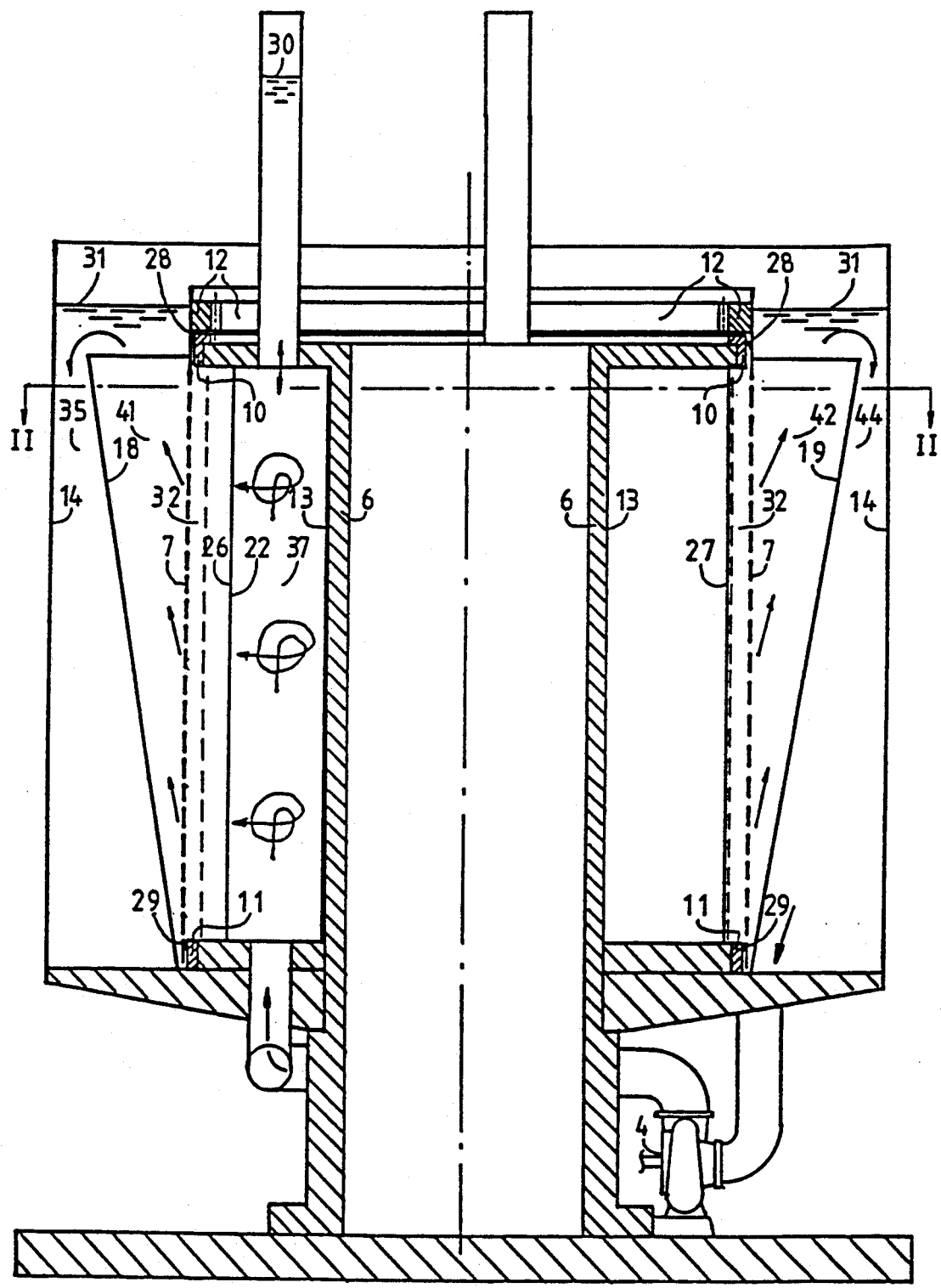
FIG. 1 depicts a vertical section of a recommended embodiment.

Apart from pumps 1, 2, 3, 4, 5, which are needed to transfer pulp suspension into the apparatus and to remove it, and also for liquid transfer, the apparatus includes in addition to the fixed support structure 6 only two moving parts: a rotating screen mantle 7 together with the drive 8 connected with it, and the stirrer 9 for the washed pulp web.

The circular shape of the screen mantle is maintained by means of an upper screen support ring 10 and a lower support ring 11. The desired rotational velocity is provided for the screen mantle by means of a screen-mantle drawing ring 12 and a drive 8 connected to it.

The liquid volume between the inner and outermost support structures 13, 14, where the screen mantle also rotates, is divided by means of partitions 15, 16, 17, 18, 19, 20, 21, 22, 23, 24, 25, 26, 27 in such a way that separate liquid chambers are formed for the different displacement steps.

The screen mantle is sealed by means of gaskets 28, 29 secured to the support rings, to enable a higher liquid level 30, 31 to be maintained inside the screen than outside the screen when there is a pulp web 32 on the screen surface.

The pulp suspension to be washed is pumped into the feed container 33 of the thickening zone, where it forms a pulp web of an even thickness on the screen mantle when part of the liquid entering along with the pulp suspension flows through the screen into the primary chamber 34 of the filtrate container outside the screen of the thickening zone. The filtrate flows first upward, and the soap and the gases separate before the filtrate flows into the secondary chamber 35 of the filtrate container, from where it is pumped out of the apparatus.

The pulp web thus formed travels together with the screen to the subsequent zone, where its first liquid displacement is carried out. In this, filtrate obtained from the subsequent washing zone is used as the displacement or washing liquid. In the last washing zone, pure water is normally used as the washing liquid.

The apparatus shown in the figures has only two washing zones, but, according to the invention, one and the same apparatus may, when necessary, have a plurality of liquid displacement zones. After the last liquid displacement, the pulp web is detached from the screen mantle by displacing liquid 36 from outside through the screen. The liquid is mixed by means of a stirrer 9 with the detached pulp, whereafter it is pumped out of the apparatus.

After the detaching of the pulp web, the bare screen proceeds to the thickening zone, where a new pulp web is again formed on it in the manner stated above.

Liquid transfer by means of pumping from one washing zone to another takes place in the apparatus from below through the support structure via pipes between the filtrate container and the feed container for the washing liquid from the preceding washing step.

In order that the pulp suspension in the thickening zone should travel all the time at the same speed as the screen mantle, the thickening zone is divided by means of a flexible partition wall 25, the distance of which from the screen decreases as the liquid coming in the pulp suspension flows through the screen. By maintaining on the other side of the above-mentioned flexible plate a liquid level higher than the level of the pulp suspension, a higher consistency is obtained, when so desired, for the pulp web than otherwise allowed by the consistency of the pulp suspension feed and the pressure difference used for the thickening. In the various liquid displacement zones there are respective flexible plates 26, 27 in order that the washing liquid should also attain the same speed as the screen and the pulp web before it meets them.

Liquid having the same concentration is used on both sides of the above-mentioned flexible plates in order that any possible untightness of the flexible plates should not cause unnecessary mixing.

Figure 2:
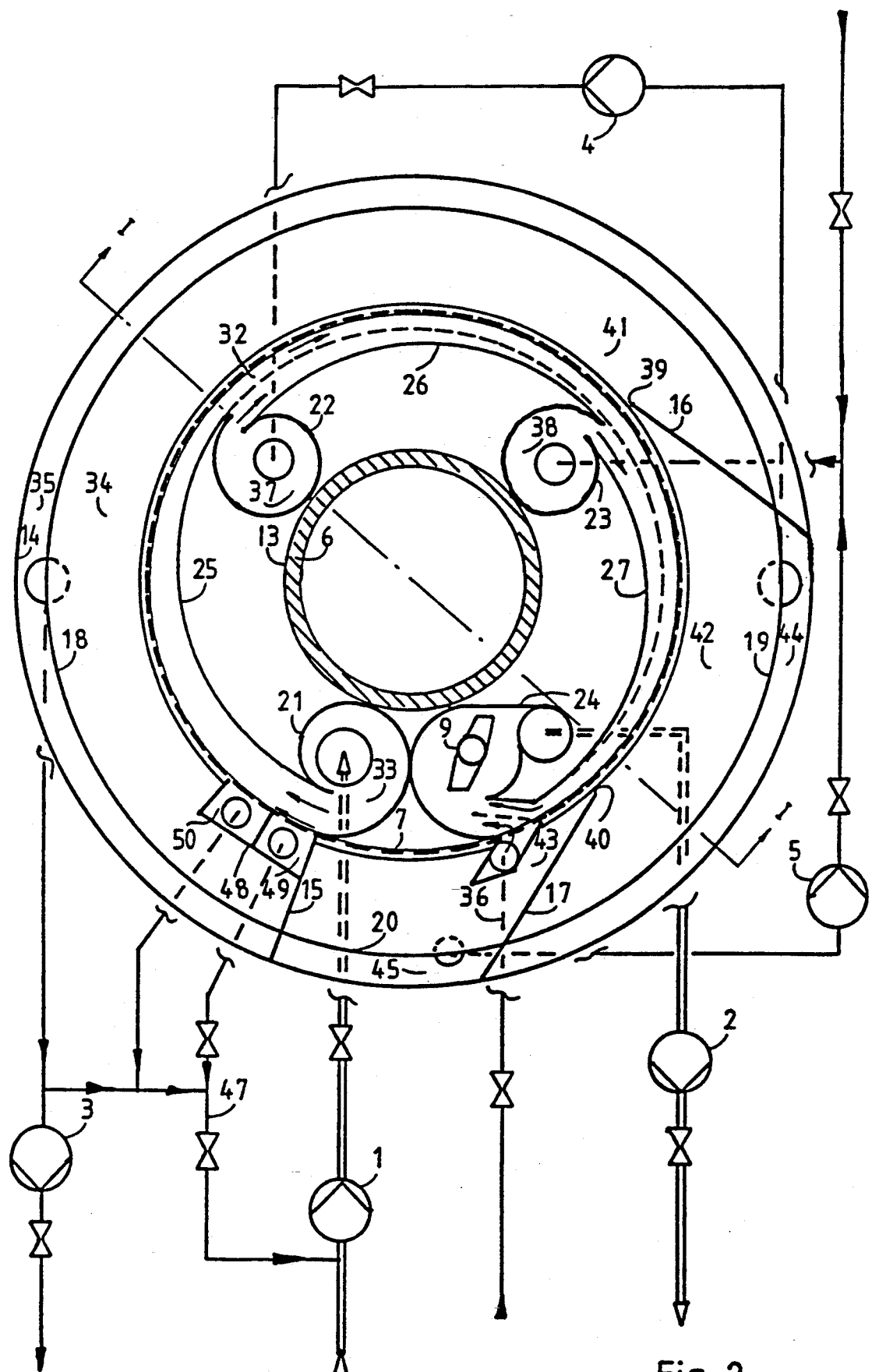
FIG. 2 depicts the corresponding horizontal section of the same.
Figure 3:
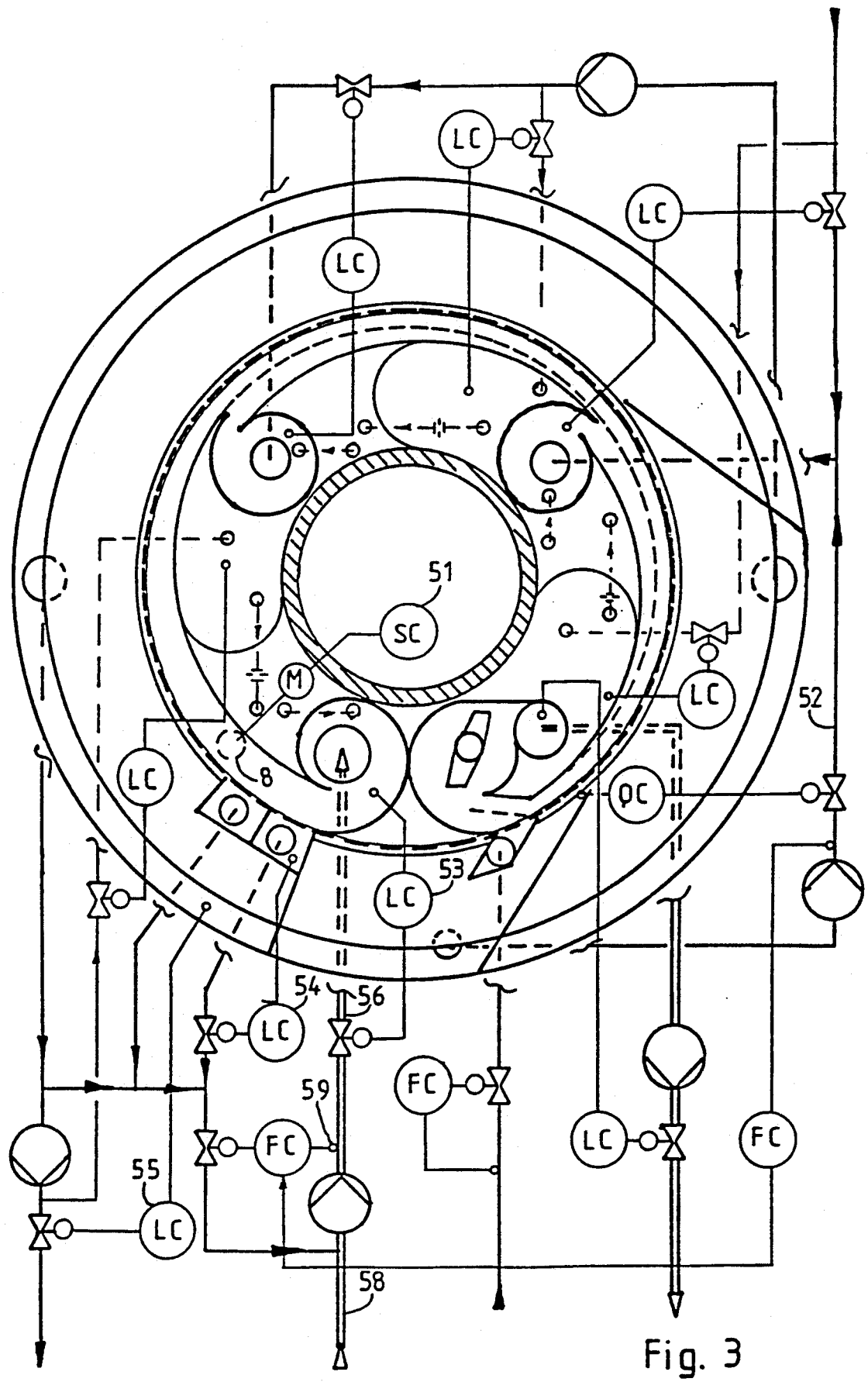
FIG. 3 depicts the principle of the control diagram of the apparatus.

In order to ensure that both the pulp suspension in the thickening zone and the washing liquid in the washing zone should flow in the above-mentioned manner at the same speed as the travel speed of the pulp web, the pulp suspension feed container 33 and the washing liquid feed containers 37, 38 have a spiral design in accordance with FIG. 2. In addition, the said flexible plates can be moved by means of a mechanical device so that their distance from the screen surface is always correct regardless of different pulp treatment capacities.

Although a relatively high pressure difference is used for producing a liquid flow through the pulp bed (approx. 3 meters of water head), the flow rate is, nevertheless, very low as compared with the travel speed of the screen and the pulp web, in the order of magnitude of only a one-hundredth part.

In order to maintain the concentration profile of the liquid flowing through the screens, the vertical partitions 16, 17 separating the different washing zones from each other have been installed parallel to the liquid flow direction at the time it leaves the screen, i.e. almost tangent to the screen mantle.

The washing zones are not tightly insulated from each other by the said partition walls; the partition walls leave a slit 39, 40 of uniform width in relation to the rotating screen drum. Via this slit the primary chambers 41, 42, 43 in the filtrate containers communicate with each other. In this manner the liquid level remains the same in all filtrate containers without their being equipped with separate liquid level controls. The liquid level can be regulated by regulating the withdrawing of filtrate only from the first washing zone.

In terms of washing efficiency an arrangement such as this is highly advantageous, since for example a filtrate which, owing to a non-optimal displacement liquid volume, has ended up in a wrong filtrate chamber can automatically pass into the correct chamber before it has become mixed with another filtrate fraction.

This arrangement also provides a possibility to balance the forces acting on the screen and thereby to minimize the friction generated in the rotation and the momentum needed. In addition, by using this arrangement it is possible within the entire capacity range, by means of very simple measurement and control, automatically to attain the desired constant washing loss with a minimized dilution.

In order to accomplish this, the filtrate container of the last washing zone has been divided into two parts by means of a partition wall 17 similar to those by means of which in the abovementioned manner the filtrate containers of the different washing zones have been separated from each other. The last washing zone is thus equipped not only with a pump 4 which pumps liquid from the container 44 of the leading end of the filtrate container into the washing water feed container 37 of the preceding washing zone, but also with another pump arrangement 5, by means of which filtrate is pumped from the container 45 of the trailing end of the filtrate container into the washing water feed container 38 of the last washing zone, and the correct amount of this filtrate is adjusted by measuring the concentration of the filtrate coming through the screen mantle at the said partition wall.

When, after the detaching zone, the rotating screen arrives, bare, in the thickening zone, at the leading end of the thickening zone not only liquid coming in the pulp suspension but also some fiber passes through it before a pulp bed impermeable to fiber has formed. In order that the filtrate 46 leaving the apparatus should not contain fiber detrimental to the further treatment (e.g. evaporation) of this filtrate, the filtrate 47 passing through the screen mantle at the leading end of the thickening zone is treated separately by using it in its entirety to dilute the pulp suspension before it is pumped into the feed container of the thickening zone of the apparatus.

In order to provide this arrangement, the leading end of the filtrate chamber of the thickening zone is sealed off from the rest of the filtrate chamber by means of a filtrate collection box 48, which seals against the screen mantle. It is advantageous to divide this box into two parts 49, 50 in such a manner that by level control of the leading end it is possible to maintain a higher liquid level and thereby to maintain a substantially lower pressure across the screen mantle than the respective pressure difference otherwise in the thickening and washing zones. In this manner it is ensured that the pulp fibers will not clog even a proportion of the holes of the bare screen mantle.

When continuous filtration of a fiber material or its thickening is concerned, the thickness of the formed bed does not change directly inversely in proportion to the travel speed of the filter surface but only inversely in proportion to the square root of its speed. Thus the filtering capacity changes directly in proportion to the square root of the speed of the filter surface when otherwise the process conditions, such as the pressure difference and the feed consistency, are maintained constant.

Respectively, when liquid displacements are carried out in the formed bed, the flow rate of the liquid changes in a corresponding manner, and thus the quantity coefficient of liquid displacement remains constant. When the capacity is changed, it is for the above reasons most advantageous primarily to alter only the speed 51 of the filter surface, in which case the dilution of the filtrate recovered will remain constant and also the washing losses will remain approximately constant.

Since the quantity coefficient of the liquid displacements is dependent on the thickness of the bed formed in the thickening and the thickness of the bed for its part is primarily dependent on the consistency of the suspension feed, the suspension consistency is primarily selected and controlled in order that the desired quantity coefficient of liquid displacement can be achieved and maintained.

Because in practice, even with a good control system, the feed consistency varies somewhat, the mean feed consistency selected is somewhat lower than what is required by the desired quantity coefficient of liquid displacements, so that when the feed consistency reaches the maximum value due to variation it is still possible to accomplish the desired quantity coefficient. This excess, due to the variation of consistency, in the quantity coefficient is "eliminated" in the above manner by recycling in the last liquid displacement zone the latter filtrate fraction 52 as a washing liquid into the same zone.

The measuring of the consistency of pulp suspension is in general problematic and vague. Besides being important for determining the correct and actual pulp production, correct determination of the consistency is also very important for the wash so that the desired washing loss could be attained using as low a dilution coefficient as possible.

In the apparatus system according to the invention, it is possible to measure and control with precision, for example the pressure difference effective across the screen mantle in the thickening zone, by measuring and adjusting the liquid levels 53, 54, 55 in this zone. For this reason there is an unambiguous dependence between the consistency of the pulp suspension feed and the total amount of the pulp suspension feed, so that when the consistency of the pulp suspension tends to increase, its respective total amount automatically decreases, since the amount of pulp increases, and therefore the thickness of the thickened bed grows at a faster rate than at a lower suspension consistency, so that its flow resistance increases, which for its part reduces the amount of pulp suspension which has time to thicken. By contrast, also when the concentration of the pulp suspension feed tends to decrease, its volume flow rate increases.

By adjusting the volume flow 56 of the pulp suspension feed so that its level 53 remains constant in the feed container and by adjusting the liquid amount which is mixed with the pulp suspension 58 before it is fed into the feed container so that the volume rate 59 of the pulp suspension feed remains constant, the consistency of the pulp suspension feed can be standardized at the desired optimal level without separate measuring of the consistency. The liquid which is mixed with the pulp suspension is filtrate from the thickening zone.

In order that this measurement and control should be as precise and rapid as possible, the cross sectional area of the level control container connected to the feed container of the thickening zone must be relatively small, i.e. in only the same order as the cross sectional area of the pulp suspension feed pipe.

In order to adjust the correct amounts of the washing liquids of the various washing zones to levels optimal in terms of the wash also in disturbance situations as rapidly as possible, the cross sectional areas of level control containers for the washing liquids of these zones must be in a corresponding manner relatively small.

Instead, the cross sectional area of the pulp suspension level control container of the detaching zone is relatively large in order that the adjustment of the pulp web detaching and dilution water will have time to occur also in disturbance situations and will thus be able to maintain constant the consistency of the washed pulp suspension leaving the apparatus system.

Apart from the facts mentioned above, it is important in order to achieve an effective wash that the device which transfers the pulp web from one washing zone to another has such a shape that it takes along with it as little liquid as possible, since in terms of effective displacement the flow conditions in the liquid chamber of such a pulp-moving device at their best correspond only to ideal mixing, which is in its effectiveness only approx. one-tenth of the effectiveness of the liquid displacement in a well-formed pulp bed.

In the washing apparatuses so far used, for example in a suction filter, this liquid chamber is quite large, even larger than the liquid volume contained in the pulp bed. This is an essential reason why the displacement efficiency of these apparatuses is even at its best only one-third of what is possible to achieve under ideal conditions. On the other hand, in the apparatus according to the invention the apparatus component conveying the pulp bed forward contains a very small liquid volume, only in the order of 1/200th part of the volume contained in the pulp bed, since it is of a perforated metal sheet only approx. 1 mm thick, its perforated part volume being approx. 20%. For this reason the effect negative in terms of displacement is practically without significance.

When this factor is added to the above-mentioned nearly ideal forming of the pulp bed and its maintenance through the entire apparatus, it follows that, from the viewpoint of the wash, the liquid displacement is close to what is achievable with an ideal pulp bed.

Apart from the above-mentioned effective liquid displacement and wash, the process according to the invention and its preferred apparatus system also provide other advantages:

with one apparatus it is possible to carry out the entire pulp wash and to displace the entire present-day washing department the apparatus is simple, small and lightweight, and it does not require a separate building the consumption of electricity is only approx. 1/10 of that of present-day apparatus other operating costs are also low, since the control is fully automatic, the maintenance and control are simpler than with present-day apparatus, and there are no problems of foaming apart from its use in the washing department, the apparatus is also especially suitable for pulp bleaching, since several liquid displacement steps can be accommodated in the same apparatus it is suitable for all types of pulp the apparatus for a production of 1000 tonnes of pulp per 24 hours is small in its dimensions, total diameter only 10 meters and height approx. 12 meters.

Although the method can be applied to highly different process conditions when the washing of pulp is concerned, in its preferred embodiment the main variables of the process are of the following order of magnitude:

The feed consistency is 2-4%. The thickness of the pulp bed, is 20-100 mm, preferably approx. 50 mm. The pressure difference for achieving the liquid displacement is 1-4 meters of water head. The screen travel speed is 0.2-1 m/s, preferably approx. 0.5 m/s. The quantity coefficient of the liquid replacement or displacement of one treatment step is approx. 1.1. On the basis of the above values, the total retention time of the fiber bed in one treatment step will be 5-15 seconds, normally approx. 10 seconds.

In this case it is possible, with an apparatus which has a screen drum diameter of approx. 8 meters and a height approx. 6 meters and which contains four washing steps, to treat 1000 tonnes of sulfate pulp per day. i.e. the apparatus alone corresponds to a whole washing department.

I claim:

1. A continuous-working process for replacing liquid in a liquid-suspension of a fibrous or finely-divided material at least in part with another liquid having different physical and/or chemical properties, by forming a bed of said material on a moving filter surface and by displacing the liquid present in this bed with the said other liquid, the bed of material being formed on a cylindrical filter surface which has been installed in a vertical orientation below the liquid surface in a container, said cylindrical filter surface conveying said bed of material continuously forward for the carrying out of a filtration and one or several successive liquid displacements, which are effected by maintaining a hydrostatic pressure difference across the formed bed, the formed bed being conveyed continuously horizontally forward, and through the formed bed there flow liquids horizontally during the filtration and liquid displacement, the bed so treated being simultaneously detached from the filter surface to form a new bed on the filter surface thus vacated.

2. A process according to claim 1, wherein the track along which the cylindrical filter surface conveys the bed of material during the filtration and the liquid displacements has a constant or nearly constant radius of curvature.

3. A process according to claim 1 or 2 wherein the bed of material is formed on the internal surface of the cylindrical filter surface.

4. A process according to claims 1 or 2 wherein the flow direction of the liquid suspension of material before a bed of material is formed is parallel to the direction of the flow of liquid in the formed bed of material, and that the direction of the flow of liquid used in the liquid displacements is, before the liquid meets the bed of material, parallel to the direction of the flow of liquid in the formed bed of material.

5. A process according to claims 1 wherein the various filtrate chambers of the liquid displacement zones are separated from each other by such partition walls that the adjacent filtrate chambers communicate with each other so that the filtrate levels in the adjacent filtrate layers remain at almost the same level and so that primarily that filtrate portion which has left the filter surface at the point of the partition moves from a filtrate chamber to the adjacent filtrate chamber.

6. A process according to claims 1 or 2 wherein the hydrostatic pressure across the filter surface for forming the pulp bed and for accomplishing liquid displacements is maintained by maintaining a higher liquid level on that side of the filter surface on which the bed of material is formed than on the other side.

7. A process according to claims 1 or 2 wherein the pulp bed is detached form the filter surface after the last liquid displacement by feeding a detaching liquid through the filter surface by maintaining a higher liquid level on the side opposite to that from which the bed of material is detached.

8. A process according to claims 1 or 2 wherein the amount of fiber material fed into the filtration and the fiber concentration in its liquid suspension is adjusted to a constant level by adjusting the liquid amount which is mixed with the fiber material suspension before it is fed into the filtration, so that the suspension feed rate remains constant when the level of suspension in its feed container or the pressure difference across the filter surface in filtration is adjusted to a constant level.

9. A process according to claims 1 or 2 wherein the filtrate of the last liquid displacement zone is divided into two fractions and the latter fraction is used as part of the washing liquid in the same liquid displacement zone, and the amount of this fraction is adjusted so that its maximum chemical concentration, which for this fraction is the concentration of that filtrate portion which is the first filtrate portion to come from the filter surface into this fraction, remains constant.

10. An apparatus for filtering a liquid suspension of a fibrous or finely-divided material and for displacing the suspension liquid with another liquid having different physical and/or chemical properties, the apparatus comprising a moving filter having a surface capable of having a bed of material formed on said filter surface and means for feeding the suspension and the displacing liquid and for collecting the liquid which has passed through the filter surface, the filter surface being formed as a vertical cylinder which is placed in a container so that it remains below the surface of the liquid in the container, in which case the flow of liquid through the filter surface and the bed on it in connection with the filtering and the liquid displacement takes place in a horizontal direction, the bed so treated being simultaneously detached from the filter surface to form a new bed on the filter surface thus vacated.

11. An apparatus according to claim 10, wherein the radius of curvature of the cylindrical filter surface on the track along which the filter surface conveys the bed of material is substantially constant.

12. An apparatus according to claim 10 or 11, wherein the means for feeding the suspension and the displacing liquid are located inside the cylindrical filter surface in such a manner that the bed of material is formed on the interior surface of the filter surface.

13. An apparatus according to claims 10 or 11 wherein the filtrate chambers of the different liquid displacement zones are separated from each other by means of such partition walls that the adjacent filtrate chambers communicate with each other so that the surface levels of the filtrates in them remain at almost the same level and in such a manner that the filtrate fraction which has left the filter surface at the partition wall is the one which primarily passes from one filtrate chamber to the adjacent filtrate chamber.

* * * * *